US012759535B2

(12) United States Patent
Kim

(10) Patent No.: US 12,759,535 B2
(45) Date of Patent: Oct. 13, 2026

(54) APPARATUS AND METHOD FOR GENERATING AND FOLLOWING AN AUTONOMOUS PARKING ROUTE USING VEHICLE CENTER AND DIRECTION VECTOR

(71) Applicants: Hyundai Motor Company, Seoul (KR); Kia Corporation, Seoul (KR)

(72) Inventor: Jang Shin Kim, Gunpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 18/912,211

(22) Filed: Oct. 10, 2024

(65) Prior Publication Data

US 2025/0178593 A1 Jun. 5, 2025

(30) Foreign Application Priority Data

Dec. 4, 2023 (KR) ........................ 10-2023-0172977

(51) Int. Cl.
*B60W 30/06* (2006.01)

(52) U.S. Cl.
CPC ......... *B60W 30/06* (2013.01); *B60W 2510/20* (2013.01); *B60W 2520/10* (2013.01); *B60W 2520/28* (2013.01); *B60W 2556/40* (2020.02); *B60W 2710/207* (2013.01)

(58) Field of Classification Search
CPC ............. B60W 30/00; B60W 2510/00; B60W 2520/00; B60W 2556/00; B60W 2710/00; B60W 10/00; B60W 40/00; B60W 60/00; B60W 2720/00
See application file for complete search history.

(56) References Cited

U.S. PATENT DOCUMENTS

| | | | | |
|---|---|---|---|---|
| 10,207,403 | B1 | 2/2019 | Wiley | |
| 12,650,310 | B2 * | 6/2026 | Gao | G01C 21/28 |
| 2016/0236589 | A1 * | 8/2016 | Sikand | B60L 15/2036 |
| 2021/0064031 | A1 * | 3/2021 | Matsuda | G01C 21/3446 |
| 2021/0370957 | A1 * | 12/2021 | Zilberman | B60W 40/105 |
| 2022/0073084 | A1 * | 3/2022 | Sakai | B62D 15/0285 |
| 2022/0176959 | A1 * | 6/2022 | Katsuki | G01G 9/00 |
| 2023/0001934 | A1 * | 1/2023 | Bosse | B60W 30/045 |
| 2023/0066522 | A1 * | 3/2023 | Hashimoto | B60W 10/10 |
| 2023/0192127 | A1 * | 6/2023 | Funke | B60W 30/025 701/25 |
| 2023/0249677 | A1 * | 8/2023 | Mizoguchi | B62D 15/0285 701/25 |

(Continued)

FOREIGN PATENT DOCUMENTS

| | | | |
|---|---|---|---|
| KR | 102144222 | B1 | 12/2020 |
| KR | 1020230090612 | A | 6/2023 |

*Primary Examiner* — Aniss Chad
*Assistant Examiner* — Elizabeth J Slowik
(74) *Attorney, Agent, or Firm* — MORGAN, LEWIS & BOCKIUS LLP

(57) ABSTRACT

In an apparatus and method for generating and following an autonomous parking route by use of a vehicle center and a direction vector, the method includes generating autonomous parking route data including direction vectors at each route point and determining the turning center of a vehicle when moving between route points based on the direction vectors at each route point and using the turning center to control steering and speed of each wheel to follow the autonomous parking route.

17 Claims, 11 Drawing Sheets

(56) References Cited

U.S. PATENT DOCUMENTS

| | | | | |
|---|---|---|---|---|
| 2023/0286523 | A1* | 9/2023 | Dumas | B60W 40/068 |
| 2023/0365154 | A1* | 11/2023 | Beauvisage | B60W 50/00 |
| 2024/0239369 | A1* | 7/2024 | Brassard | B60W 60/001 |
| 2024/0383485 | A1* | 11/2024 | Djuric | B60W 40/10 |
| 2025/0018934 | A1* | 1/2025 | Niwa | G06V 20/56 |
| 2025/0171014 | A1* | 5/2025 | Okabe | B60W 50/14 |

* cited by examiner

APPARATUS AND METHOD FOR GENERATING AND FOLLOWING AN AUTONOMOUS PARKING ROUTE USING VEHICLE CENTER AND DIRECTION VECTOR

CROSS-REFERENCE TO RELATED APPLICATIONS

The present application claims priority to Korean Patent Application No. 10-2023-0172977, filed Dec. 4, 2023, the entire contents of which is incorporated herein for all purposes by this reference.

BACKGROUND OF THE PRESENT DISCLOSURE

Field of the Present Disclosure

The present disclosure relates to an apparatus and method for generating and following an autonomous parking route by use of a vehicle center and a direction vector.

Description of Related Art

The statements in the present section merely provide background information related to the present disclosure and do not necessarily form related art.

A technology is developed to assist in the parking of a vehicle by a parking facility control center guiding the vehicle route. The vehicle may receive, from the parking facility control center, information on the parking facility, route guidance information, and the like. The information on the parking facility may include various data of a high-precision map of the parking facility, measurements by various sensors such as cameras, including information on the parking space and surrounding obstacles, and the width of the road in the parking facility. As route information for a vehicle to move from its current location to a vacant parking space, the route guidance information is provided to the vehicle by the parking facility control center that determines a vacant parking space and generates a corresponding route.

An in-wheel motor that has been developed is capable of reducing the turning radius of the vehicle by controlling steering and speed of each motor independently. An in-wheel motor refers to an electric motor mounted on a wheel to directly drive the wheels of a vehicle. Conventional vehicles have a central motor or engine provided in the engine compartment of the vehicle, whereby the engine power is transmitted to the wheels through various shafts and gears. In contrast, the in-wheel motor system enables the wheels to self-generate their driving force, improving the efficiency of power use, reducing the weight of the vehicle by removing the large drive motor that was provided in the engine compartment, and allowing the space in the engine compartment to be repurposed.

The steering device for vehicles is a system for implementing vehicle steering, and the rear wheel steering (RWS) system pursues the maneuverability of the vehicle at low speeds and the vehicle stability at high speeds by adjusting the steering angle of the rear wheels according to the front wheel angle and the vehicle speed. In the past, autonomous driving followed routes based on the rear wheel axle, but with the rear-wheel steering device for incorporating steerable rear tire wheels, those routes can now be followed by the autonomous vehicle based on the center of the vehicle.

An electric vehicle with an electric charging port or vehicle inlet at the front of the vehicle has a greater need for front parking. Vehicle merchantability could be improved by enabling such parking at one go in consideration of various information received from the parking facility control center and vehicle specifications such as the minimum turning radius of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for generating and following an autonomous parking route by use of a vehicle center and a direction vector.

The exemplary embodiments of the present disclosure provide a method of generating autonomous parking route data including direction vectors at each route point.

The exemplary embodiments of the present disclosure provide a method of determining the turning center of a vehicle when moving between route points based on the direction vectors at each route point and using the turning center to control steering and speed of each wheel to follow the autonomous parking route.

The purposes of the present disclosure are not limited to those mentioned above, and other purposes not mentioned herein will be clearly understood by those skilled in the art from the following description.

According to at least an exemplary embodiment of the present disclosure, the present disclosure provides a method of generating and following an autonomous parking route by use of a vehicle center and a direction vector including generating a parking route including coordinates of route points indicating locations to which a center of a vehicle moves until the vehicle reaches a parking end point, and a direction angle at each route point, and iteratively performing, until the vehicle reaches the parking end point, steps of: determining a turning center point of the vehicle based on a first direction vector at a first route point and a second direction vector at a second route point, the first direction vector and the second direction vector being determined based on the parking route, and the first direction vector and the second direction vector being unit vectors, determining a steering angle for each wheel of the vehicle and a power frequency of each wheel using the turning center point, and outputting the steering angle for each wheel to a corresponding steering device of the vehicle and applying power of the power frequency for each wheel to a corresponding in-wheel motor of the vehicle while the vehicle is moving from the first route point to the second route point.

According to another exemplary embodiment of the present disclosure, the present disclosure provides a determining device including at least one processor and a memory operatively coupled to the at least one processor, wherein the memory stores instructions that cause the at least one processor to perform operations in response to an execution of the instructions by the at least one processor, and wherein the operations including generating a parking route including coordinates of route points indicating locations to which a center of a vehicle moves until the vehicle reaches a parking end point, and a direction angle at each route point, and iteratively performing, until the vehicle reaches the parking end point, steps of: determining a turning center point of the vehicle based on a first direction vector at a first route point and a second direction vector at a second route point, the first direction vector and the second direction vector being determined based on the parking route, and the first direction vector and the second direction vector being unit vectors, determining a steering angle for each wheel of the vehicle and a power frequency of each wheel using the turning center point, and outputting the steering angle for each wheel to a corresponding steering device of the vehicle and applying power of the power frequency for each wheel to a corresponding in-wheel motor of the vehicle while the vehicle is moving from the first route point to the second route point.

According to various exemplary embodiments of the present disclosure, by generating and following an autonomous parking route based on the center of the vehicle, the vehicle can more accurately follow the autonomous parking route.

According to various exemplary embodiments of the present disclosure, the stability and convenience of autonomous parking may be improved.

The effects of the present disclosure are not limited to the effects mentioned above, and other effects not mentioned will be clearly understood by those skilled in the art from the description below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
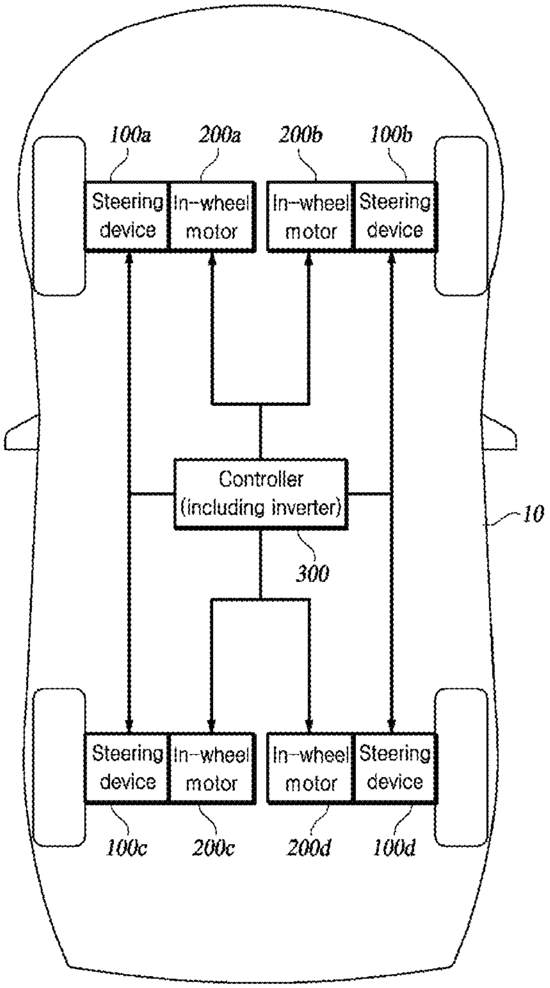
FIG. 1 is a diagram illustrating a vehicle provided with some components of an apparatus for generating and following an autonomous parking route by use of a vehicle center and a direction vector, according to at least an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the following description, like reference numerals designate like elements, although the elements are shown in different drawings. Furthermore, for clarity and for brevity, the following description of various exemplary embodiments will omit a detailed description of related known components and functions when considered obscuring the subject of the present disclosure.

Various ordinal numbers or alpha codes such as first, second, i), ii), a), b), etc., are prefixed solely to differentiate one component from the other but not to imply or suggest the substances, order, or sequence of the components. Throughout the present specification, when a part "includes" or "comprises" a component, the part is meant to further include other components, to not exclude thereof unless specifically stated to the contrary. The terms such as "unit," "module," and the like refer to units in which at least one function or operation is processed and they may be implemented by hardware, software, or a combination thereof.

The description of the present disclosure to be presented below in conjunction with the accompanying drawings is directed to describe exemplary embodiments of the present disclosure and is not intended to represent the only embodiments in which the technical idea of the present disclosure may be practiced.

As used herein, the term "turning center" refers to a turning center point which is external to the vehicle and may be used interchangeably with the term "center of turning." The term "turning radius" may be used interchangeably with the term "radius of turning."

As used herein, the sign of a wheel-specific steering angle is negative when the wheel is steered to the right based on the vehicle's direction of travel, and positive when the wheel is steered to the left based on the vehicle's direction of travel.

When an autonomous vehicle parks in a parking facility, it may search for an empty parking space in the parking facility, select a target parking space, autonomously drive to the target parking space, and then perform autonomous parking. The process of searching for and selecting a target parking space in the parking facility may be vehicle-driven or parking facility control center-driven. For the vehicle to move near to the target parking space, autonomous driving may be performed along a driving route provided by the parking facility control center and/or a navigation system.

The present disclosure relates to techniques for generating a route for autonomous parking near a target parking space and controlling a vehicle to follow the generated route.

At least an exemplary embodiment of the present disclosure, the present disclosure may generate an autonomous parking route that includes information on the locations of route points along which the vehicle center will move for autonomous parking, and information on a heading angle or direction angle at each route point. According to at least an exemplary embodiment of the present disclosure, the turning center of the vehicle may be determined based on the information on the locations of the route points and the direction angle at each route point, and the turning center may be used to control each wheel-specific steering and wheel-specific speed of the vehicle to follow the autonomous parking route. According to at least an exemplary embodiment of the present disclosure, the autonomous parking route may be corrected to reduce errors in following the autonomous parking route.

FIG. 1 is a diagram illustrating a vehicle provided with some components of an apparatus for generating and following an autonomous parking route by use of a vehicle center and a direction vector, according to at least an exemplary embodiment of the present disclosure.

Referring to FIG. 1, a vehicle 10 according to at least an exemplary embodiment of the present disclosure is provided with steering devices 100*a*, 100*b*, 100*c*, 100*d*, in-wheel motors 200*a*, 200*b*, 200*c*, 200*d*, and a controller 300.

The steering devices 100*a*, 100*b*, 100*c*, 100*d* perform steering by receiving a wheel-specific steering angle inputted from the controller 300.

The in-wheel motors 200*a*, 200*b*, 200*c*, 200*d* are mounted on the internal side of the respective wheels of the vehicle 10 and are configured for accelerating and decelerating by receiving alternating current power of a wheel-specific power frequency from the controller 300.

The controller 300 generates an autonomous parking route, is configured to control wheel-specific steering by determining the steering angle of each wheel to follow the generated autonomous parking route, and is configured to control wheel-specific speed by determining the speed of each wheel and controlling the power frequency of each in-wheel motor.

Figure 2A:
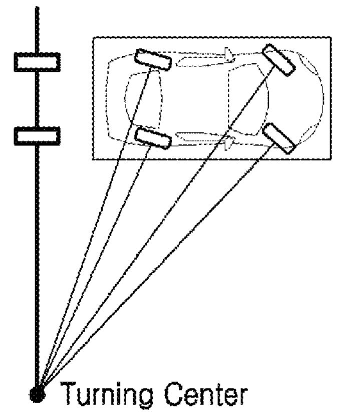
FIG. 2A, FIG. 2B and FIG. 2C are diagrams illustrating the turning centers of vehicles according to the steering situations for each wheel.
Figure 2B:
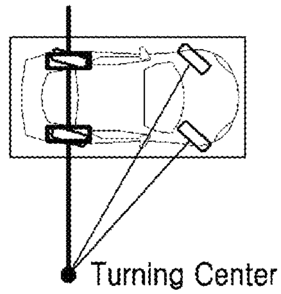
Figure 2C:
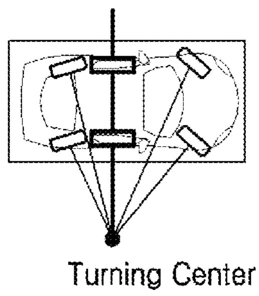

The turning centers of vehicles according to the steering situations for each wheel are described with reference to FIG. 2A, FIG. 2B and FIG. 2C. FIG. 2A illustrates the turning center of a vehicle with a RWS system when the rear-wheel steering angle is in phase with, that is, in the same direction as the front-wheel steering angle. The front and rear wheels may be controlled in phase at high speeds to improve the driving stability of the vehicle. FIG. 2B illustrates the turning center of a vehicle without a RWS system, i.e., a vehicle with front-wheel steering only. FIG. 2C shows the turning center of the vehicle with a RWS system when the rear-wheel steering angle is in reverse phase, that is, in the opposite direction of the front-wheel steering angle. The front and rear wheels may be controlled in reverse phase at low speeds to reduce the turning radius of the vehicle and thereby improve maneuverability.

Figure 3:
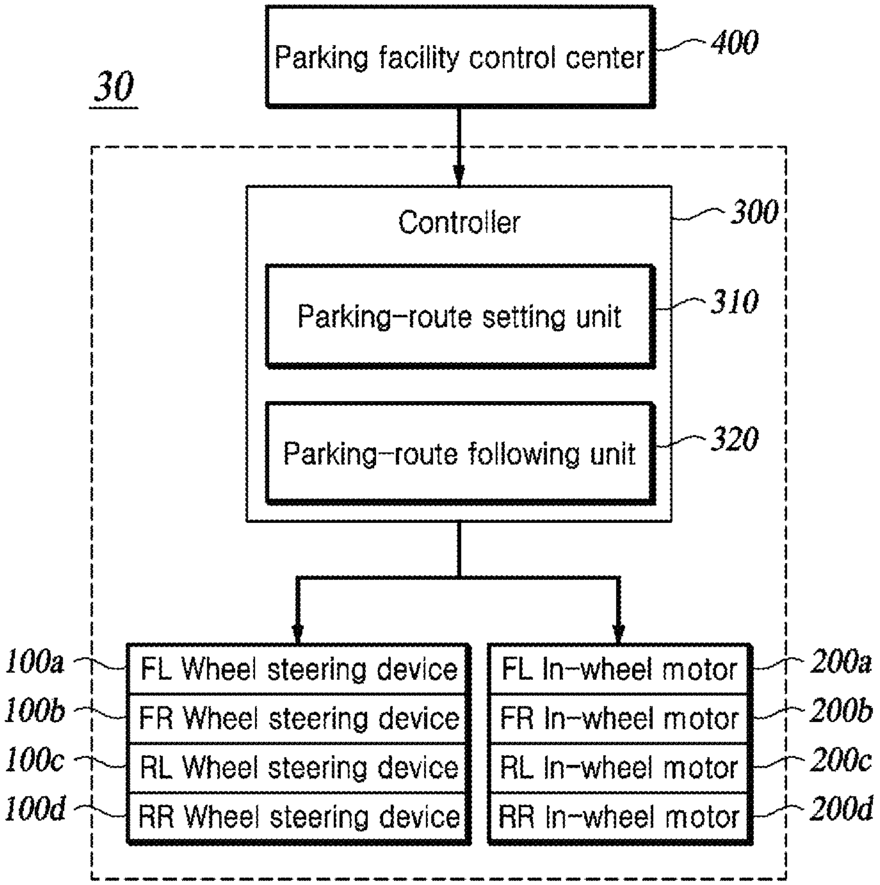
FIG. 3 is a block diagram of an apparatus for generating and following an autonomous parking route by use of a vehicle center and a direction vector, according to at least an exemplary embodiment of the present disclosure.

FIG. 3 is a block diagram of an apparatus for generating and following an autonomous parking route by use of a vehicle center and a direction vector, according to at least an exemplary embodiment of the present disclosure.

Referring to FIG. 3, an apparatus for generating and following an autonomous parking route by use of a vehicle center and a direction vector, according to at least an exemplary embodiment of the present disclosure, which is hereinafter referred to as the "parking-route generating and following apparatus" 30 may generate an autonomous parking route including information on locations of route points along which the center of the vehicle is to travel and direction angles at the respective route points. It may determine in each step, based on the generated autonomous parking route, the turning center of the vehicle based on the direction vector of a first route point and the direction vector of a second route point. Accordingly, it may use the turning center of the vehicle to control each wheel-specific steering and speed of the vehicle to follow the autonomous parking route. To the present end, the parking-route generating and following apparatus 30 includes the steering devices 100*a*, 100*b*, 100*c*, 100*d*, the in-wheel motors 200*a*, 200*b*, 200*c*, 200*d*, and the controller 300. The parking-route generating and following apparatus 30 may further include various sensors for recognizing the surrounding environment and/or obtaining driving information. The parking-route generating and following apparatus 30 may further include a communication unit of transmitting and receiving signals or data to or from a parking facility control center 400.

The components of the parking-route generating and following apparatus 30 may transmit or receive signals or data by use of various communication protocols present in the vehicle. Here, the communication protocols may include at least one of Controller Area Network (CAN), CAN with flexible data rate (CAN FD), Local Interconnect Network (LIN), FlexRay, and ethernet.

The steering devices (100*a*, 100*b*, 100*c*, 100*d*) and in-wheel motors (200*a*, 200*b*, 200*c*, 200*d*) have been described above.

The controller 300 generates an autonomous parking route based on the specifications of the vehicle and information on the parking facility. It determines in each step, based on the generated autonomous parking route, a turning center of the vehicle based on the direction vector of the first route point and the direction vector of the second route point. Then, it controls, in each step, each wheel-specific steering and speed of the vehicle by use of the turning center. To the present end, the controller 300 includes a parking-route setting unit 310 and a parking-route following unit 320. The controller 300 may further include an inverter.

Information on the vehicle's specification may include tread, wheelbase, front/rear overhang, maximum steering angle of the front wheels, maximum steering angle of the rear wheels, and the like.

Information on the parking facility is transmitted from the parking facility control center 400 when the vehicle enters the parking facility. The information on the parking facility may include a map of the parking facility, information on a target parking space for the vehicle to park in, information on obstacles in the vicinity of the target parking space, information on roads within the parking facility, and the like. When a map of the parking facility is stored in the vehicle's navigation system or the like, that information may be utilized.

The controller 300 resides inside the vehicle and may be an electronic control unit (ECU). The controller 300 may include, but not limited to, a hardware processor and memory which may include commands for executing the controller 300, a lookup table (LUT). The controller 300 may include all components configured to perform overall control of the parking-route generating and following apparatus.

The parking-route setting unit 310 generates an autonomous parking route based on information on the vehicle's specifications and information on the parking facility. The parking-route setting unit 310 may be configured to generate an autonomous parking route by use of information on the vehicle's specifications, information on the width of the roads within the parking facility, information on the extra space around the target parking space, and the like. When there is an extra unoccupied space around the target parking space or on the road ahead within the parking facility, the parking-route setting unit 310 may be configured to generate an autonomous parking route by use of the extra unoccupied space.

The following describes the process performed by the parking-route setting unit 310 for setting a parking route when there is an extra unoccupied space around the target parking space at the inside of the turn of the vehicle.

Figure 4:
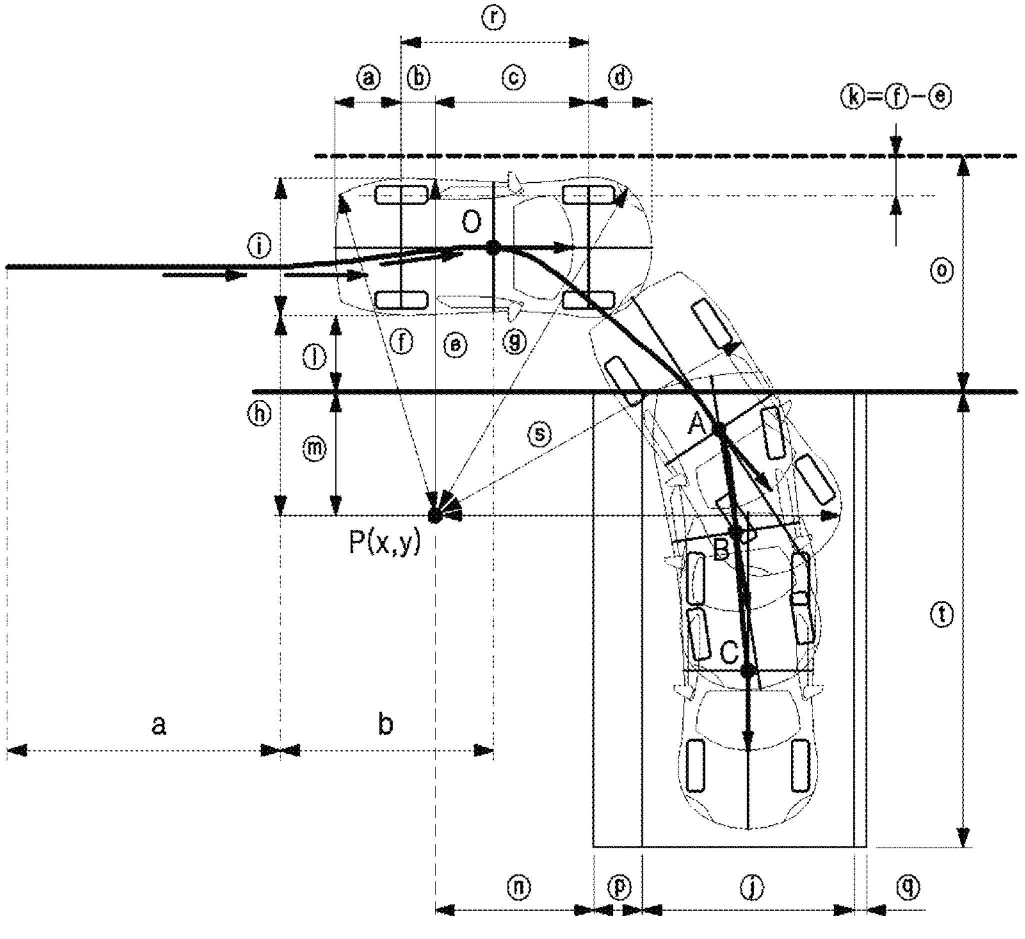
FIG. 4 is a diagram illustrating a process of setting a parking route when an extra unoccupied space adjacent to a target parking space is present at the inside of the turn of a vehicle, according to at least an exemplary embodiment of the present disclosure.

Referring to FIG. 4, the vehicle specifications, i.e., the tread ⓘ, wheelbase ⓡ, and maximum steering angles of the front and rear wheels are used to set the vehicle's turning center P(x, y) with the smallest radius from the vehicle center O.

Using the vehicle specifications, i.e., the vehicle's tread ⓘ, wheelbase ⓡ, rear overhang ⓐ, and front overhang ⓓ, the values ⓚ, ⓔ, ⓕ, and ⓖ are determined for the vehicle not to violate the road boundary (depicted as the thick dotted line in FIG. 4) when the vehicle turns about the turning center P(x, y). Here, ⓚ is the margin distance between the vehicle and the road boundary for turning, ⓔ is the perpendicular distance from the turning center to the vehicle's side at the outside of the turn, ⓕ is the longest turning radius of the rear bumper when turning, and ⓖ is the longest turning radius of the front bumper when turning.

Using the width ⓞ of the road and the tread ⓘ of the vehicle, the process determines the distance ⓛ (=ⓞ−ⓚ−ⓘ) between the road boundary and the vehicle and the distance ⓜ (=ⓔ−ⓛ−ⓘ) between the road boundary and the turning center.

The process determines the maximum value of a minimum required distance ⓝ that ensures that no interference is present up to the maximum proximity point ⓢ by taking into account the extra unoccupied space around the target parking space at the inside of the turn of the vehicle. The maximum value of the minimum required distance may be determined using $ⓛ+ⓜ \geq \sqrt{(ⓜ^2+ⓜ^2)}$. Here, the minimum required distance ⓝ is the least distance from the turning center, required to turn with the shortest distance ⓗ between the vehicle and the turning center.

The process determines the minimum distance ⓟ (=ⓖ−ⓙ−ⓝ−ⓠ) for the front bumper not to leave the target parking space by taking into account the minimum turning radius of the vehicle. Based on information received from the parking facility control center 400 regarding whether there are obstacles around the target parking space, the process may represent the turning center P of the vehicle in the global coordinates, and use the extra unoccupied space if greater in width than ⓟ as a space for moving the vehicle, drawing a smooth trajectory of the vehicle center.

The parking-route setting unit 310 stores, as route data, the coordinates and the direction angles of route points sampled at a minimum unit travel distance (e.g., in units of 1 cm per 100 ms) during the reference sample time. The route coordinates are represented in a global coordinate system.

The parking-route setting unit 310 may set a parking route by dividing it into a plurality of sections ('a', 'b', 'OA', 'AB', and 'BC'), as shown in FIG. 4.

In the 'a' section, the parking route may be set with the center of the road. For example, the route points in the 'a' section may be set so that the respective coordinates are located on a straight line and have the same direction angle.

In the 'b' section, the parking route may be set by smoothly connecting the endpoint of the 'a' section with the point O. For example, the parking route may be set with a clothoid in the 'b' section. For example, a vector and coordinates may be set tangent to a line in the middle of two vectors, and a detailed vector may be filled in by use of the first vector and the middle vector. In the instant case, the turning radius which is formed by drawing a perpendicular line to the direction vector of the route points from the turning center point P needs to be greater than the minimum turning radius of the vehicle.

In the 'OA' section, based on information on obstacles around the target parking space, information on the roads in the parking facility, vehicle specifications, etc., the parking route may be set by the minimum turning radius of the vehicle and drawn in an arc. The turning center is P(x, y). For example, the front end portion of the vehicle turns to the point where it meets the line separated from the parking line by a margin ⓠ On the other hand, if no extra space around the target parking space is available, the vehicle may utilize an extra unoccupied space provided on the road ahead.

Figure 5:
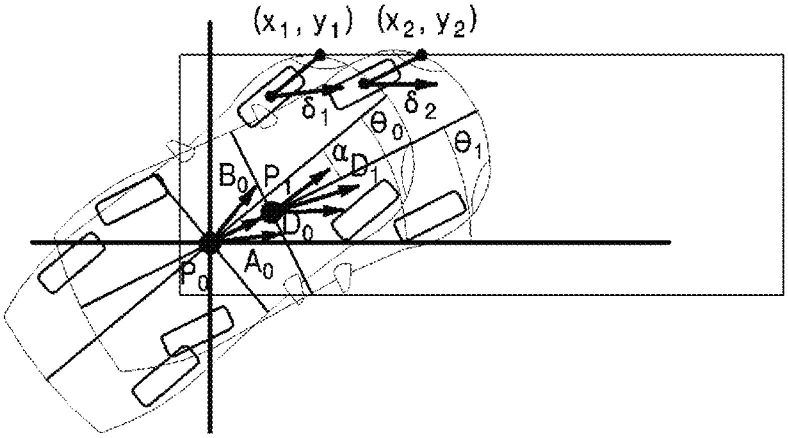
FIG. 5 is a diagram illustrating a detailed process of setting a section of a parking route when an extra unoccupied space adjacent to a target parking space is present at the inside of the turn of a vehicle, according to at least an exemplary embodiment of the present disclosure.

In the 'AB' section, the parking route may be set by determining a center point and a direction angle of the vehicle while moving the left front end point of the vehicle in line with the external parking line until the center of the right rear wheel reaches the internal parking line. This will be explained with reference to FIG. 5. In FIG. 5, A is the direction vector of the left front wheel, B is the direction vector of the right rear wheel, D is the direction vector of the vehicle center, δ is the direction angle of vector A at the vehicle center axis. As the vehicle moves, δ changes, but the direction angle of vector B at the vehicle center axis remains the same.

The process sets the coordinates relative to the vehicle centered at $P_0$. Namely, the process performs a coordinate conversion with the origin centered at $P_0$. Because the right front end portion of the vehicle follows the external parking line, the y-coordinate value remains the same while the $x_1$ value changes. The $(x_1, y_1)$ coordinate is the left front end portion of the vehicle, which is determined relative to the vehicle center.

For the vehicle's left front end portion to move from $(x_1, y_1)$ to $(x_2, y_1)$, it needs to turn by a certain amount of α and go straight by a certain amount 'd'. Here, 'd' is a predefined value, which may be a minimum unit distance traveled during a sample period, e.g., 1 cm per 100 ms.

Because $\theta_0$ is a predetermined value, the value of α may be determined, and the value of $x_2$ is determined. Here, $\theta_0$ is an angle formed by the vehicle's direction of travel with the external parking line when the vehicle's left front end portion is positioned at $(x_1, y_1)$, $\theta_1$ is an angle formed by the vehicle's direction of travel with the external parking line when the vehicle's left front end portion is positioned at $(x_2, y_1)$. For example, the $x_2$ value may be determined as shown in Equation 1.

$$\begin{bmatrix} x_2 \\ y_1 \\ 1 \end{bmatrix} = \begin{bmatrix} \cos(-\alpha) & -\sin(-\alpha) & d\cos\theta_1 \\ \sin(-\alpha) & \cos(-\alpha) & d\sin\theta_1 \\ 0 & 0 & 1 \end{bmatrix} \begin{bmatrix} x_2 \\ y_1 \\ 1 \end{bmatrix} \quad \text{(Equation 1)}$$

$$\alpha = \theta_0 - \theta_1,\ \theta_1 = \theta_0 - \alpha$$

$$\begin{aligned} y_1 &= -x_1\sin\alpha + y_1\cos\alpha + d\sin(\theta_0 - \alpha) \\ &= -x_1\sin\alpha + y_1\cos\alpha + d\sin\theta_0\cos\alpha - d\sin\alpha\cos\theta_0 \end{aligned}$$

$$y_1 = (-x_1 - d\cos\theta_0)\sin\alpha + (y_1 + d\sin\theta_0)\cos\alpha$$

$$y_1 = \sqrt{(-x_1 - d\cos\theta_0)^2 + (y_1 + d\sin\theta_0)^2}\cos(\alpha - \beta)$$

$$\left(\sin\beta = \frac{-x_1 - d\cos\theta_0}{\sqrt{(-x_1 - d\cos\theta_0)^2 + (y_1 + d\sin\theta_0)^2}},\ \cos\beta = \frac{y_1 + d\sin\theta_0}{\sqrt{(-x_1 - d\cos\theta_0)^2 + (y_1 + d\sin\theta_0)^2}}\right)$$

$$\alpha = \operatorname{acos}\left(\frac{y_1}{\sqrt{(-x_1 - d\cos\theta_0)^2 + (y_1 + d\sin\theta_0)^2}}\right) + \beta$$

$$x_2 = x_1\cos\alpha + y_1\sin\alpha + d\cos(\theta_0 - \alpha)$$

Here, the value of α is the turning angle in the counter-clockwise direction, wherein α>0.

The direction angle $(\theta_0-\alpha)$ of $P_0$ is converted with the global coordinates' x-axis as a reference and stored as the parking route data along with the coordinates of $P_0$.

The global coordinates of $P_1$ are stored as parking route data by adding to the coordinates of $P_0$ the values of the traveled distance $(d\cos(\theta_0-\alpha), d\sin(\theta_0-\alpha))$ after the coordinate conversion.

Similarly, the movement of the left front end portion of the vehicle from $(x_2, y_1)$ to $(x_3, y_1)$ may be obtained by performing a rotation transformation by α value and a translation transformation by d $(d\cos\theta_2, d\sin\theta_2)$.

The center points and direction angles of the vehicle are determined while progressively aligning the left front end portion of the vehicle to the external parking line until the center of the right rear wheel reaches the internal parking line, and stored as parking route data.

In the 'BC' section, the process determines the turning center point of the vehicle by use of the coordinates and direction vector of the vehicle center at the current location and the coordinates and direction vector at the next location, and stores the coordinates of the movement of the center of the vehicle around the turning center point and the direction angle, as parking route data. Here, the coordinates and direction vector of the next position are predetermined values.

The following describes a process performed by the parking-route setting unit 310 for setting a parking route when there is an extra unoccupied space on the road ahead within the parking facility.

Figure 6:
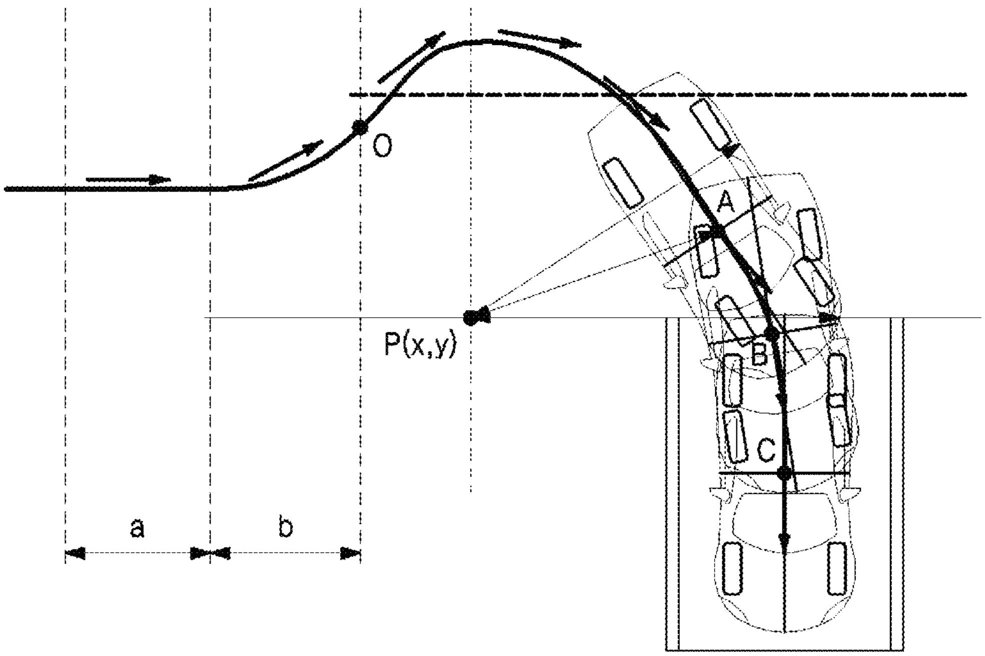
FIG. 6 is a diagram illustrating a process of setting a parking route when an extra unoccupied space is present on the road ahead within a parking facility, according to at least an exemplary embodiment of the present disclosure.

When there is no free space around the target parking space, the exemplary embodiment may utilize the unoccupied space of the road within the parking facility. Referring to FIG. 6, for the sections 'a', 'b', 'AB', and 'BC', a parking route may be equally set when there is an extra unoccupied space around the target parking space at the inside of the turn of the vehicle.

First, when a vehicle enters 'a' section, the vehicle specifications are used as a basis for selecting a turning center point P(x, y) with a minimum turning radius, which is located on the parking space entry line. Then, in the 'OA' section, the parking route may be set by turning a vehicle in simulation to a point where the left front end portion of the vehicle meets a line separated from the parking line by margin ⓠ.

The following describes the process performed by the parking-route setting unit 310 for setting a parking route when extra free space is present around the target parking space at the outside of the turn of the vehicle.

Figure 7:
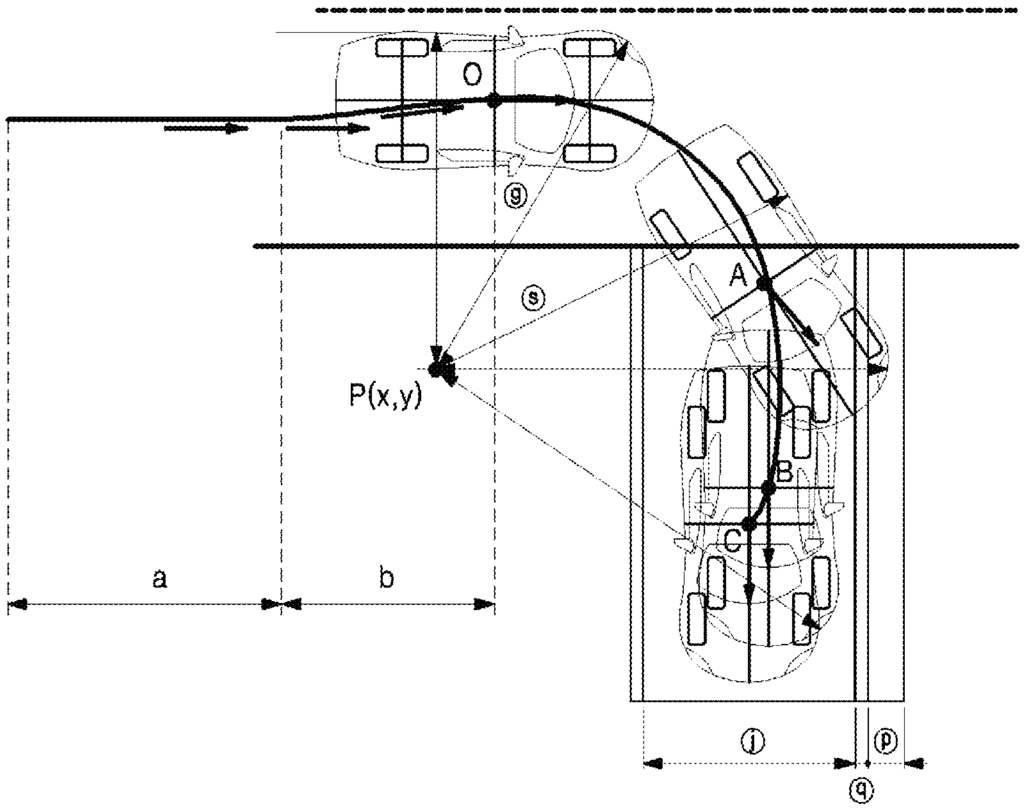
FIG. 7 is a diagram illustrating a process of setting a parking route when an extra unoccupied space adjacent to a target parking space is present at the outside of the turn of a vehicle, according to at least an exemplary embodiment of the present disclosure.

FIG. 7 illustrates a situation where there is an extra unoccupied space at the outside of the turn of the vehicle. In the instant case, the parking route may be set by use of the same process as in the case where there is an extra unoccupied space around the target parking space at the inside of the turn of the vehicle.

One example of parking route data set through the above process is shown in Table 1.

TABLE 1

| | Vector Position Coordinates/Direction Angle Based On Global Coordinates | | | | Distance Traveled Per Unit Step/Direction Angle Relative To Vehicle Origin | | |
|---|---|---|---|---|---|---|---|
| Section | x | y | θ (degree) | θ (radian) | d | Σθ (degree) | Σθ (radian) |
| a | 0.0 | 150.0 | 0.0 | 0.000000 | 20.0 | 0.0 | −0.000000 |
| a | 20.0 | 150.0 | 0.0 | 0.000000 | 20.0 | 0.0 | −0.000000 |
| b | 39.7 | 153.8 | 11.0 | 0.192502 | 20.0 | 11.0 | −0.192502 |
| b | 59.3 | 157.7 | 11.0 | 0.192502 | 20.0 | 0.0 | −0.000000 |
| b | 79.0 | 161.5 | 11.0 | 0.192502 | 20.0 | 0.0 | −0.000000 |
| b | 98.7 | 165.3 | 11.0 | 0.192502 | 20.0 | 0.0 | −0.000000 |
| b | 118.3 | 169.2 | 11.0 | 0.192502 | 20.0 | 0.0 | −0.000000 |
| b | 138.0 | 173.0 | 11.0 | 0.192502 | 20.0 | 0.0 | −0.000000 |

TABLE 1-continued

| | Vector Position Coordinates/Direction Angle Based On Global Coordinates | | | | Distance Traveled Per Unit Step/Direction Angle Relative To Vehicle Origin | | |
|---|---|---|---|---|---|---|---|
| Section | x | y | θ (degree) | θ (radian) | d | Σθ (degree) | Σθ (radian) |
| b | 157.7 | 176.8 | 11.0 | 0.192502 | 20.0 | 0.0 | −0.000000 |
| b | 177.3 | 180.7 | 11.0 | 0.192502 | 20.0 | 0.0 | −0.000000 |
| b | 197.0 | 184.5 | 11.0 | 0.192502 | 20.0 | 0.0 | −0.000000 |
| b | 216.7 | 188.3 | 11.0 | 0.192502 | 20.0 | 0.0 | −0.000000 |
| b | 236.3 | 192.2 | 11.0 | 0.192502 | 20.0 | 0.0 | −0.000000 |
| b | 256.0 | 196.0 | 0.0 | 0.000000 | 20.0 | −11.0 | −0.192502 |
| OA | 275.6 | 190.6 | −3.3 | −0.057821 | 20.0 | −3.3 | −0.057821 |
| OA | 294.9 | 184.1 | −6.6 | −0.115642 | 20.0 | −3.3 | −0.057821 |
| OA | 313.8 | 176.5 | −9.9 | −0.173463 | 20.0 | −3.3 | −0.057821 |
| OA | 332.2 | 167.8 | −13.3 | −0.231284 | 20.0 | −3.3 | −0.057821 |
| OA | 350.0 | 158.1 | −16.6 | −0.289105 | 20.0 | −3.3 | −0.057821 |
| OA | 367.3 | 147.4 | −19.9 | −0.346925 | 20.0 | −3.3 | −0.057821 |
| OA | 384.0 | 135.7 | −23.2 | −0.404746 | 20.0 | −3.3 | −0.057821 |
| OA | 399.9 | 123.1 | −26.5 | −0.462567 | 20.0 | −3.3 | −0.057821 |
| OA | 415.2 | 109.6 | −29.8 | −0.520388 | 20.0 | −3.3 | −0.057821 |
| OA | 429.6 | 95.2 | −33.1 | −0.578209 | 20.0 | −3.3 | −0.057821 |
| OA | 443.2 | 80.1 | −36.1 | −0.636030 | 20.0 | −3.3 | −0.057821 |
| OA | 455.9 | 64.2 | −39.4 | −0.693851 | 20.0 | −3.3 | −0.057821 |
| OA | 467.6 | 47.6 | −43.1 | −0.751672 | 20.0 | −3.3 | −0.057821 |
| OA | 478.4 | 30.3 | −46.4 | −0.809493 | 20.0 | −3.3 | −0.057821 |
| OA | 488.2 | 12.5 | −49.7 | −0.867314 | 20.0 | −3.3 | −0.057821 |
| OA | 497.0 | −5.9 | −53.0 | −0.925134 | 20.0 | −3.3 | −0.057821 |
| OA | 504.7 | −24.7 | −56.3 | −0.982955 | 20.0 | −3.3 | −0.057821 |
| AB | 514.6 | −42.0 | −60.3 | 1.052675 | 20.0 | −4.0 | −0.069719 |
| AB | 523.6 | −59.9 | −65.3 | −1.104156 | 20.0 | −2.9 | −0.051481 |
| AB | 531.8 | −78.1 | −65.6 | −1.144626 | 20.0 | −2.3 | −0.040470 |
| BC | 536.9 | −97.4 | −67.4 | −1.178142 | 20.0 | −1.9 | −0.033516 |
| BC | 541.4 | −116.9 | −69.4 | −1.211658 | 20.0 | −1.9 | −0.033516 |
| BC | 545.2 | −136.6 | −71.3 | −1.245174 | 20.0 | −1.9 | −0.033516 |
| BC | 548.3 | −156.3 | −73.3 | −1.278690 | 20.0 | −1.9 | −0.033516 |
| BC | 550.8 | −176.2 | −75.2 | −1.312206 | 20.0 | −1.9 | −0.033516 |
| BC | 552.5 | −196.1 | −77.1 | −1.345722 | 20.0 | −1.9 | −0.033516 |
| BC | 553.7 | −216.0 | −79.0 | −1.379238 | 20.0 | −1.9 | −0.033516 |
| BC | 554.1 | −236.0 | −80.9 | −1.412754 | 20.0 | −1.9 | −0.033516 |
| BC | 553.9 | −256.0 | −82.9 | −1.446270 | 20.0 | −1.9 | −0.033516 |
| BC | 553.0 | −276.0 | −08.8 | −1.479786 | 20.0 | −1.9 | −0.033516 |
| BC | 551.5 | −290.0 | −86.7 | −1.513302 | 20.0 | −1.9 | −0.033516 |
| BC | 549.3 | −315.8 | −88.6 | −1.546818 | 20.0 | −1.9 | −0.033516 |

Upon receiving a request to correct the parking route, the parking-route setting unit 310 may correct the parking route based on the current location coordinates and direction angle of the vehicle, and route error information.

The parking-route following unit 320 is configured to determine in each step a turning center point of the vehicle until the vehicle reaches the parking end point, and by use of the turning center point, is configured to determine the wheel-specific steering angle and wheel-specific power frequency, and based on the determination, is configured to control the wheel-specific steering and wheel-specific speed of the vehicle. Here, the step refers to a movement between two adjacent route points among those obtained from the parking route. When obtaining the route points from the parking route, sampling may be performed. The coordinates of each route point obtained from the parking route are provided in a global coordinate system.

Hereinafter, the route point before movement in each step is referred to as the first route point, and the route point after movement is referred to as the second route point.

The parking-route following unit 320 is configured to determine in each step a turning center point of the vehicle based on a first direction vector at the first route point and a second direction vector at the second route point. Here, the first direction vector and the second direction vector are unit vectors. To the present end, the parking-route following unit 320 is configured to perform at each step a local coordinate system conversion process, a process of determining the first direction vector and the second direction vector, and a process of determining the turning center point.

Figure 8A:
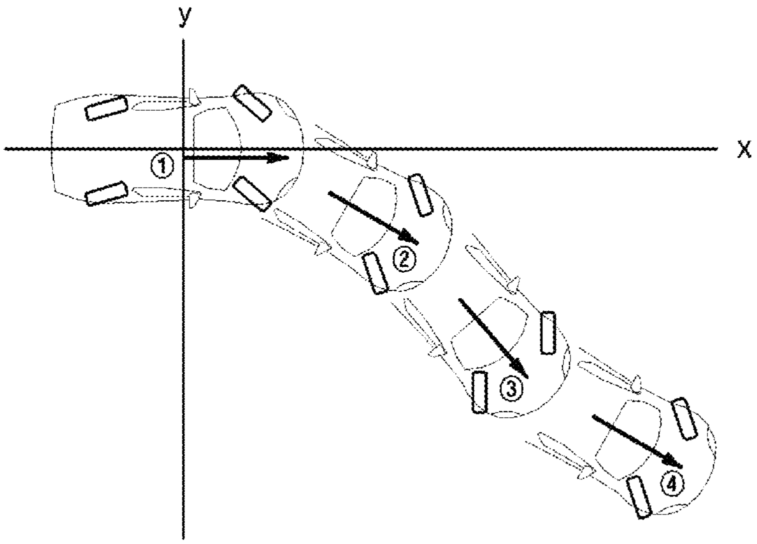
FIG. 8A, FIG. 8B, and FIG. 8C are diagrams illustrating local coordinate system conversions according to the movements of a vehicle in a parking-route following process according to at least an exemplary embodiment of the present disclosure.
Figure 8B:
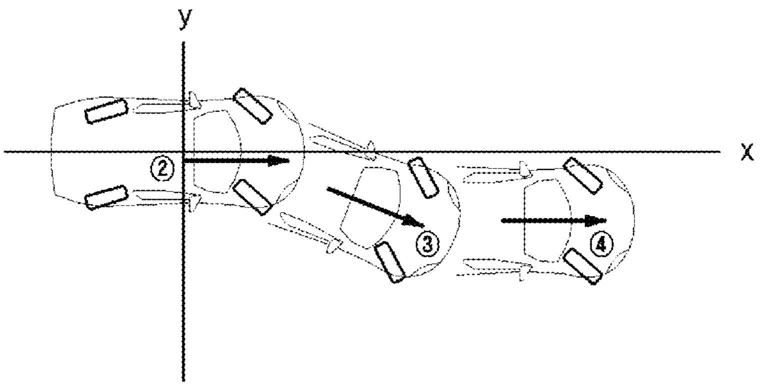
Figure 8C:
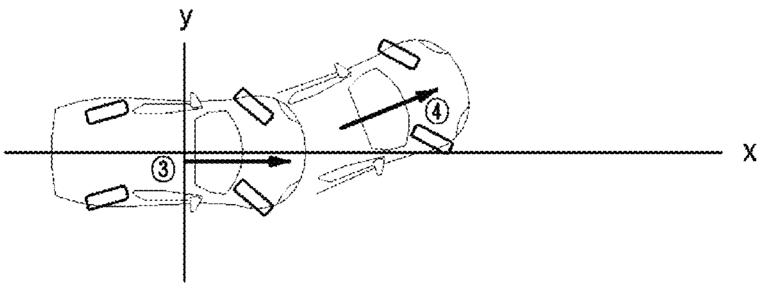

The parking-route following unit 320 sets in each step a local coordinate system with the first route point as a reference point, and converts the coordinates of the first route point and the coordinates of the second route point to the local coordinate system. FIG. 8A, FIG. 8B, and FIG. 8C illustrate local coordinate system conversions according to the vehicle movements, according to at least an exemplary embodiment of the present disclosure. For example, if the route points are given as ①, ②, ③, and ④, the local coordinate system in the step from ① to ② may be set as shown in FIG. 8A, the local coordinate system in the step from ② to ③ may be set as shown in FIG. 8B, the local coordinate system in the step from ③ to ④ may be set as shown in FIG. 8C.

The parking-route following unit 320 is configured to determine the first direction vector based on the local coordinates and direction angle of the first route point and is configured to determine the second direction vector based on the local coordinates and direction angle of the second route point. The parking-route following unit 320 is configured to perform translation, rotation, and cross product operations on the first direction vector and second direction vector to determine a turning center point of the vehicle.

Figure 9A:
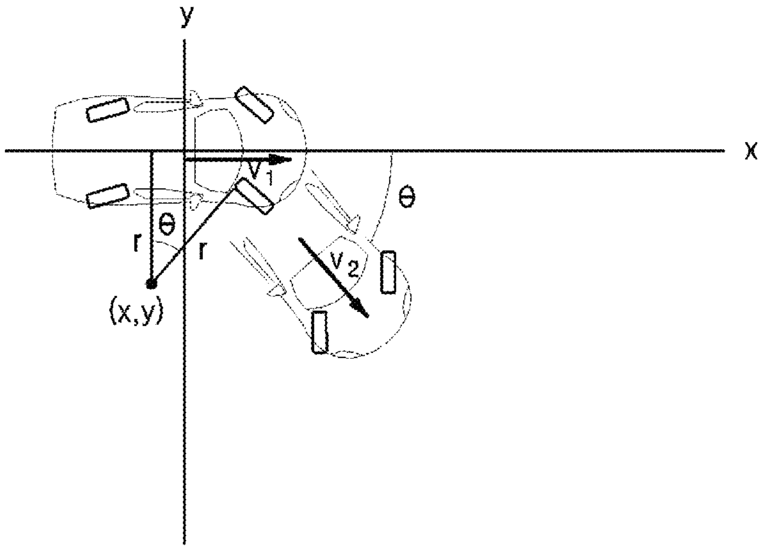
FIG. 9A and FIG. 9B are diagrams illustrating a process of determining a turning center point of a vehicle by use of the vehicle center and a direction vector in a parking-route following process according to at least an exemplary embodiment of the present disclosure.
Figure 9B:
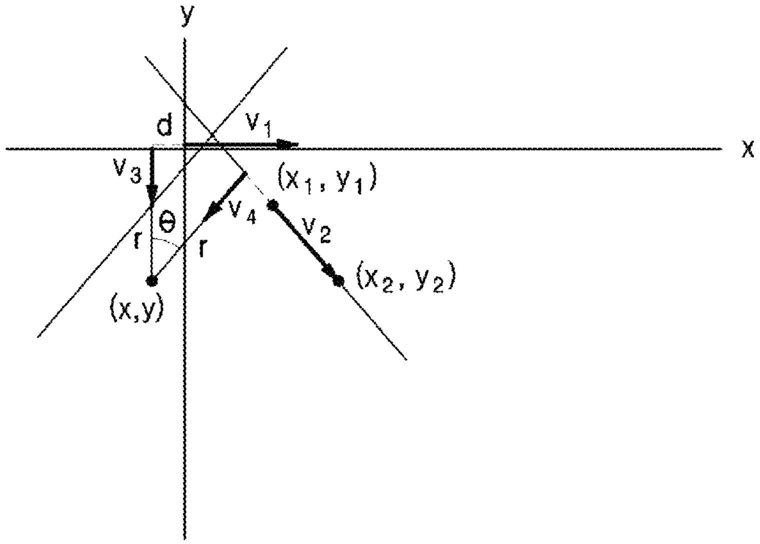

FIG. 9A and FIG. 9B are diagrams illustrating a process of determining a turning center point of a vehicle by use of the vehicle center and a direction vector in a parking-route following process according to at least an exemplary embodiment of the present disclosure.

Referring to FIG. 9A and FIG. 9B, when the first direction vector $v_1$ and the second direction vector $v_2$ are determined as shown in Equation 2, the turning center point (x, y) of the vehicle is determined by assuming that the vehicle turns about the turning center point (x, y) with a radius of r by θ. Where θ is the angle formed between the second direction vector $v_2$ and the x-axis, that is, the difference between the direction angle of the first direction vector $v_1$ and the direction angle of the second direction vector $v_2$, and r is the distance between the turning center point of the vehicle and the vehicle center. $(x_1, y_1)$ represents the starting point of the second direction vector $v_2$, which is the coordinates of the vehicle center at the second route point.

$$v_1 = \begin{bmatrix} 1 & 0 \\ 0 & 0 \\ 1 & 1 \end{bmatrix}, \; v_2 = \begin{bmatrix} x_2 & x_1 \\ y_2 & y_1 \\ 1 & 1 \end{bmatrix} \quad \text{(Equation 2)}$$

$$R_1 = \begin{bmatrix} \cos\theta & -\sin\theta & 0 \\ \sin\theta & \cos\theta & 0 \\ 0 & 0 & 1 \end{bmatrix}$$

$$T_d = \begin{bmatrix} 1 & 0 & d \\ 0 & 1 & 0 \\ 0 & 0 & 1 \end{bmatrix}, \; T_x = \begin{bmatrix} 1 & 0 & x_1 + d\cos\theta \\ 0 & 1 & y_1 + d\sin\theta \\ 0 & 0 & 1 \end{bmatrix}$$

The process performs translation and rotation transformations on the first direction vector $v_1$ to obtain $v_3$ and $v_4$ as shown in Equation 3.

$$v_3 = T_d * R_1\left(-\frac{\pi}{2}\right) * v_1 = \begin{bmatrix} d & d \\ -1 & 0 \\ 1 & 1 \end{bmatrix} = [\,p_1, \; p_2\,], \quad \text{(Equation 3)}$$

$$v_4 = T_x * R_1(\theta) * (-T_d) * v_3 =$$

$$\begin{bmatrix} \sin\theta + d\cos\theta + x_1 & d\cos\theta + x_1 \\ -\cos\theta + d\sin\theta + y_1 & d\sin\theta + y_1 \\ 1 & 1 \end{bmatrix} = [\,p_3, \; p_4\,]$$

Based on start points and end points of $v_3$ and $v_4$, the process performs a cross-product operation as shown in Equation 4 to obtain the coordinates of the intersection point.

$$\begin{aligned} v_{cross\ product} &= (p_2 \times p_1) \times (p_3 \times p_4) \quad \text{(Equation 4)} \\ &= \begin{bmatrix} 1 \\ 0 \\ -d \end{bmatrix} \times \begin{bmatrix} -\cos\theta \\ -\sin\theta \\ x_1\cos\theta + y_1\sin\theta + d \end{bmatrix} \\ &= \begin{bmatrix} -d\sin\theta \\ d\cos\theta - x_1\cos\theta - y_1\sin\theta + d \\ -\sin\theta \end{bmatrix}. \\ &= -\sin\theta \begin{bmatrix} d \\ \frac{(x_1 - d)\cos\theta}{\sin\theta} + y_1 + d/\sin\theta \\ 1 \end{bmatrix}, \end{aligned}$$

$$\text{Coordinates of Intersection} = \begin{bmatrix} d \\ \frac{(x_1 - d)\cos\theta}{\sin\theta} + y_1 + d/\sin\theta \\ 1 \end{bmatrix}$$

The process determines 'd' as shown in Equation 5 by use of the fact that the distance r as measured from the turning center point of the vehicle to the center axis of the vehicle is the same at each of the first route point and the second route point.

$$r^2 = \left(\frac{(x_1 - d)\cos\theta}{\sin\theta} + d/\sin\theta + y_1\right)^2 = \quad \text{(Equation 5)}$$

$$(d - x_1 - d\cos\theta)^2 + \left(\frac{(x_1 - d)\cos\theta}{\sin\theta} + d/\sin\theta + -d\sin\theta\right)^2$$

$$d = \frac{y_1^2 + 2x_1y_1\frac{\cos\theta}{\sin\theta} - x_1^2}{2\left(y_1\frac{\cos\theta}{\sin\theta} - \frac{y_1}{\sin\theta} - x_1\right)}$$

By obtaining the value of 'd' through the process described above, the coordinates of the turning center point of the vehicle, that is, the coordinates of the intersection point in Equation 4 may be obtained by substituting the coordinates $(x_1, y_1)$ of the second route point and θ.

For example, if the starting point of the second direction vector $v_2$ is (1, −1) and θ is $$-\frac{\pi}{4},$$

'd' may be determined as $$-\frac{\sqrt{2}}{2}$$

by use of Equation 5, and the coordinates (x, y) of the turning center point of the vehicle may be determined as $$\left(-\frac{\sqrt{2}}{2}, -1 - \frac{\sqrt{2}}{2}\right)$$

by use of Equation 4.

On the other hand, for a vehicle without rear-wheel steering, the value of 'd' is fixed as the distance between the vehicle center and the center of the rear axle. This is because, as described above in FIG. 2B, the turning center point of a vehicle capable of front-wheel steering falls on the extension of the rear wheel axle.

The parking-route following unit 320 is configured to determine a wheel-specific steering angle and a wheel-specific power frequency of the vehicle by use of the determined turning center point of the vehicle.

Figure 10:
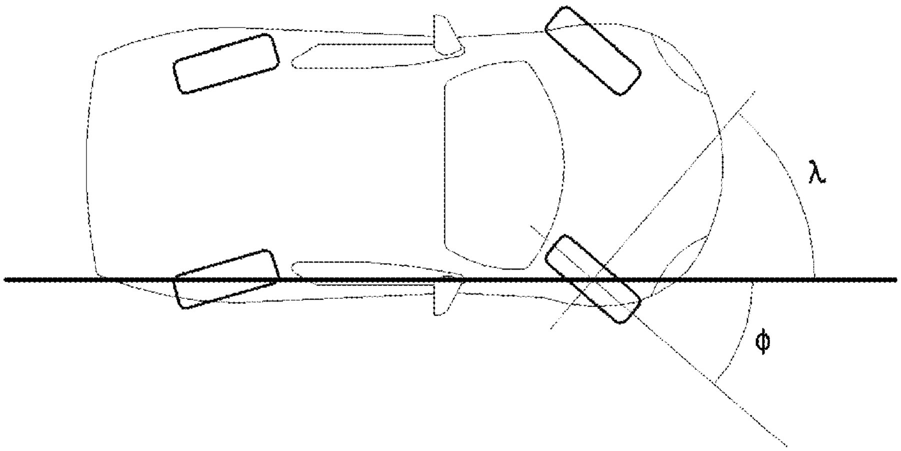
FIG. 10 is a diagram illustrating a process of determining a wheel-specific steering angle based on a vehicle's turning center point and a center position of each wheel in a parking-route following process according to at least an exemplary embodiment of the present disclosure.

The parking-route following unit 320 is configured to determine the wheel-specific steering angle by use of the turning center point of the vehicle. Furthermore, the parking-route following unit 320 is configured to determine the turning radius of the vehicle and the wheel-specific turning radius by use of the turning center point of the vehicle. Referring further to FIG. 10, the steering angle determination process will be described.

Based on the turning center of the vehicle and the center positions of the respective wheels, the wheel-specific steering angle and the wheel-specific turning radius may be determined.

The wheel-specific steering angle may be obtained as shown in Equation 6.

$$\varphi_{tire} = \lambda - \frac{\pi}{2},\ \lambda = \tan^{-1}\left((y' - y)/(x' - x)\right) \quad \text{(Equation 6)}$$

Here, $\varphi_{tire}$ is the wheel-specific steering angle, $\lambda$ is an angle formed by the vehicle's direction of travel with a straight line passing the wheel-specific center position (x', y') and the turning center point of the vehicle (x, y).

The turning radius $R_{vehicle}$ of the vehicle may be obtained based on the turning center point of the vehicle and the center position of the vehicle, as shown in Equation 7.

$$R_{vehicle} = \sqrt{x^2 + y^2} \quad \text{(Equation 7)}$$

The wheel-specific turning radius $R_{tire}$ may be obtained as shown in Equation 8 based on the vehicle's turning center point and the vehicle's wheel-specific center position.

$$R_{tire} = \sqrt{(y' - y)^2 + (x' - x)^2} \quad \text{(Equation 8)}$$

The parking-route following unit 320 is configured to determine the wheel-specific power frequency based on the wheel-specific turning radius and the required speed. Here, the required speed is a minimum one of a limit speed or a speed set by a user. Here, the limit speed is the maximum speed at which a rollover does not occur by the turning radius of the vehicle.

The parking-route following unit 320 may be configured to determine an angular velocity of the vehicle based on the vehicle's turning radius and the required speed, determine a wheel-specific speed by use of the vehicle's angular velocity and wheel-specific turning radius, and determine a wheel-specific power frequency by use of the wheel-specific speed and the wheel-specific radius.

The angular velocity of each wheel is equal to the angular velocity $\omega$ of the vehicle center. Each wheel's speed $V_{tire}$ is proportional to the wheel-specific turning radius $R_{tire}$. For example, the wheel-specific speed is determined by the wheel-specific turning radius and the angular velocity of the vehicle as shown in Equation 9.

$$\omega = \frac{V}{R_{vehicle}},\ V_{tire} = R_{tire} * \omega \quad \text{(Equation 9)}$$

Here, V is the required speed.

The wheel-specific power frequency $f_{tire}$ may be obtained from each tire's radius $r_{tire}$ and wheel-specific speed $V_{tire}$ as shown in Equation 10.

$$f_{tire} = V_{tire}/(r_{tire} * 2\pi),\ V_{tire} = r_{tire} * \omega = r_{tire} * 2\pi f_{tire} \quad \text{(Equation 10)}$$

The parking-route following unit 320 outputs, in each step during the time that the vehicle moves from the first route point to the second route point, a wheel-specific steering angle $\varphi_{tire}$ to a corresponding steering device and applies a power of a wheel-specific power frequency $f_{tire}$ to a corresponding in-wheel motor. Here, the time taken in each step for the vehicle to move from the first route point to the second route point may be obtained as shown in Equation 11 based on the direction angle $\theta$ that the second direction vector v2 makes with the x-axis, the vehicle's turning radius $R_{vehicle}$, and the required speed V.

$$t = \frac{R_{vehicle} * \theta}{v},\ \left(V = \frac{R_{vehicle} * \theta}{t}\right) \quad \text{(Equation 11)}$$

The parking-route following unit 320 repeats, in each step, the processes described above until the vehicle reaches the parking end point.

The parking-route following unit 320 may check whether an error occurs while the vehicle is moving along the parking route and may respond accordingly. Due to noise generated when the vehicle moves, noise generated when measuring the position of the vehicle through sensor fusion, and the like, errors may occur in a form of discrepancy in each step between the position and direction angle of the vehicle center being moved and the position and direction angle of the vehicle center on the parking route being followed.

The parking-route following unit 320 may, for example, confirm the discrepancy between the vehicle's first pose estimated by use of an unscented Kalman filter or the like and the second pose of the vehicle on the parking route being followed, and further perform a process of correcting the turning center point of the vehicle based on the discrepancy. Here, the first pose and the second pose each include position and direction angle information and may be represented by a direction vector.

Figure 11A:
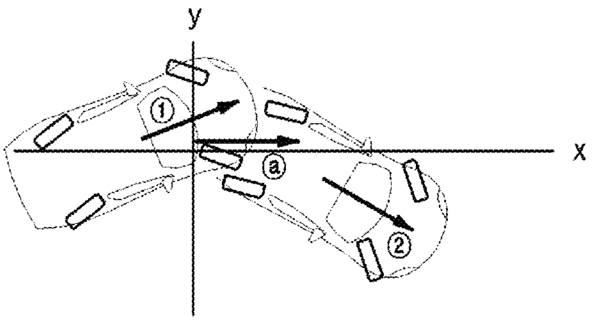
FIG. 11A, FIG. 11B, FIG. 11C, and FIG. 11D are diagrams illustrating a process of correcting an error which may occur in a parking-route following process according to at least an exemplary embodiment of the present disclosure.
Figure 11B:
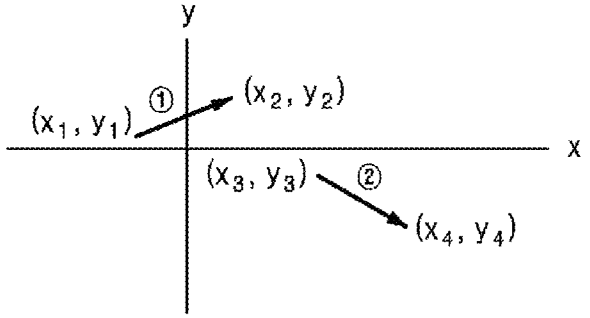
Figure 11C:
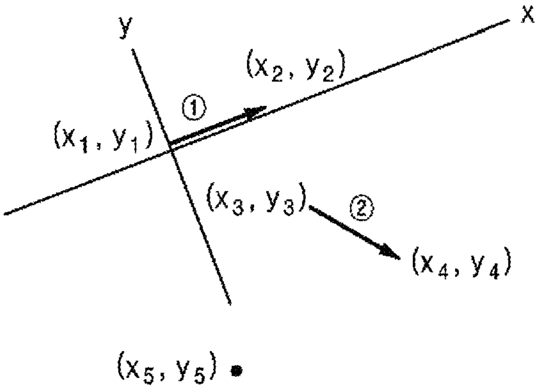
Figure 11D:
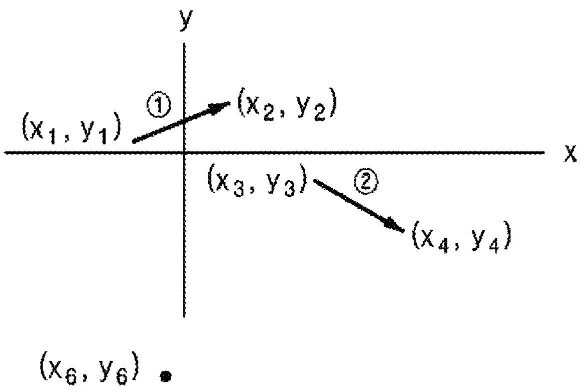

FIG. 11A illustrates a situation where a discrepancy occurs between the vehicle's first pose ① estimated and the second pose ⓐ of the vehicle on the parking route being followed. As shown in FIGS. 11B and 11C the process takes the starting point of the direction vector ① as the origin, performs a coordinate axis rotation and translation transformation to align the vehicle axis, and determines the vehicle turning center point ($x_5$, $y_5$) in the current step based on the direction vector ① and the direction vector ②. Accordingly, as shown in FIG. 11D, the coordinate axis is rotated and translated about the original axis to determine ($x_6$, $y_6$). Then, using ($x_6$, $y_6$) coordinates as the vehicle's turning center point, the process determines the distance to the vehicle center, wheel-specific steering angle, and wheel-specific speed. Meanwhile, if there is a change in the distance traveled by the vehicle in each step, the travel time to the destination may be kept the same by increasing or decreasing the input speed. The above process is repeated for every step.

The parking-route following unit 320 may use an unscented Kalman filter (UKF) to ensure that the vehicle is as close as possible in following the parking route without the position and direction angle of the vehicle center having an issue due to noise caused by the movement of the vehicle, noise caused by measuring the position of the vehicle through sensor fusion, etc. The parking-route following unit 320 may estimate the pose of the vehicle by use of the unscented Kalman filter.

A system model that takes as input the vehicle's travel distance 'd' and direction angle $\Delta\theta_k$ and outputs coordinates ($x_k$, $y_k$) of the vehicle center and a direction angle $\varphi_k$ may be represented as shown in Equation 12.

$$X(k) = AX(k-1) + \quad \text{(Equation 12)}$$

-continued $$BU(k)+w(k)=\begin{bmatrix}x_k\\y_k\\\varphi_k\end{bmatrix}=\begin{bmatrix}1&0&0\\0&1&0\\0&0&1\end{bmatrix}\begin{bmatrix}x_{k-1}\\y_{k-1}\\\varphi_{k-1}\end{bmatrix}+$$

$$\begin{bmatrix}1&0&0\\0&1&0\\0&0&1\end{bmatrix}\begin{bmatrix}d\cos\Delta\theta_k\\d\sin\Delta\theta_k\\\Delta\theta_k\end{bmatrix}+\begin{bmatrix}w_{11}&w_{12}&w_{14}\\w_{21}&w_{22}&w_{23}\\w_{31}&w_{32}&w_{33}\end{bmatrix}$$

$$Z(k)=HX(k)+v(k)=\begin{bmatrix}zx_k\\zy_k\\z\varphi_k\end{bmatrix}=\begin{bmatrix}1&0&0\\0&1&0\\0&0&1\end{bmatrix}\begin{bmatrix}x_k\\y_k\\\varphi_k\end{bmatrix}+\begin{bmatrix}v_{11}&0&0\\0&v_{22}&0\\0&0&v_{33}\end{bmatrix}$$

Here, X(k) refers to a state variable, Z(k) refers to a measurement, A refers to a system matrix, B refers to an input matrix, H refers to an output matrix, w(k) refers to a system noise generated by the conditions of the vehicle, and v(k) refers to a measured noise.

An unscented Kalman filter algorithm may iteratively perform the steps of: 1) selecting initial values $X_0$, $P_0$; 2) determining sigma points $\chi_k$ and weights $W_k$; 3) performing translation transformation on sigma points $\chi_k$ through a system function; 4) predicting estimates $X_{k\_p}$ and error covariances $P_{k\_p}$ of the estimates, 5) performing translation transformation on the estimates through the output matrix H, 6) predicting the measurements $Z_{k\_p}$ and the error covariance $P_z$ of the measurements, 7) determining the Kalman gain $K_k$, 8) determining the estimates $X_k$, and 9) determining the error covariance $P_k$.

The parking-route following unit 320 may request the parking-route setting unit 310 to correct the parking route if the discrepancy between the first pose and the second pose is greater than or equal to a threshold value.

The inverter inverts direct current power from the battery into alternating current power and supplies the latter to the in-wheel motors 200*a*, 200*b*, 200*c*, 200*d*. The inverter may supply the inverted alternating current power to the corresponding in-wheel motors 200*a*, 200*b*, 200*c*, 200*d* based on a wheel-specific power frequency.

Figure 12:
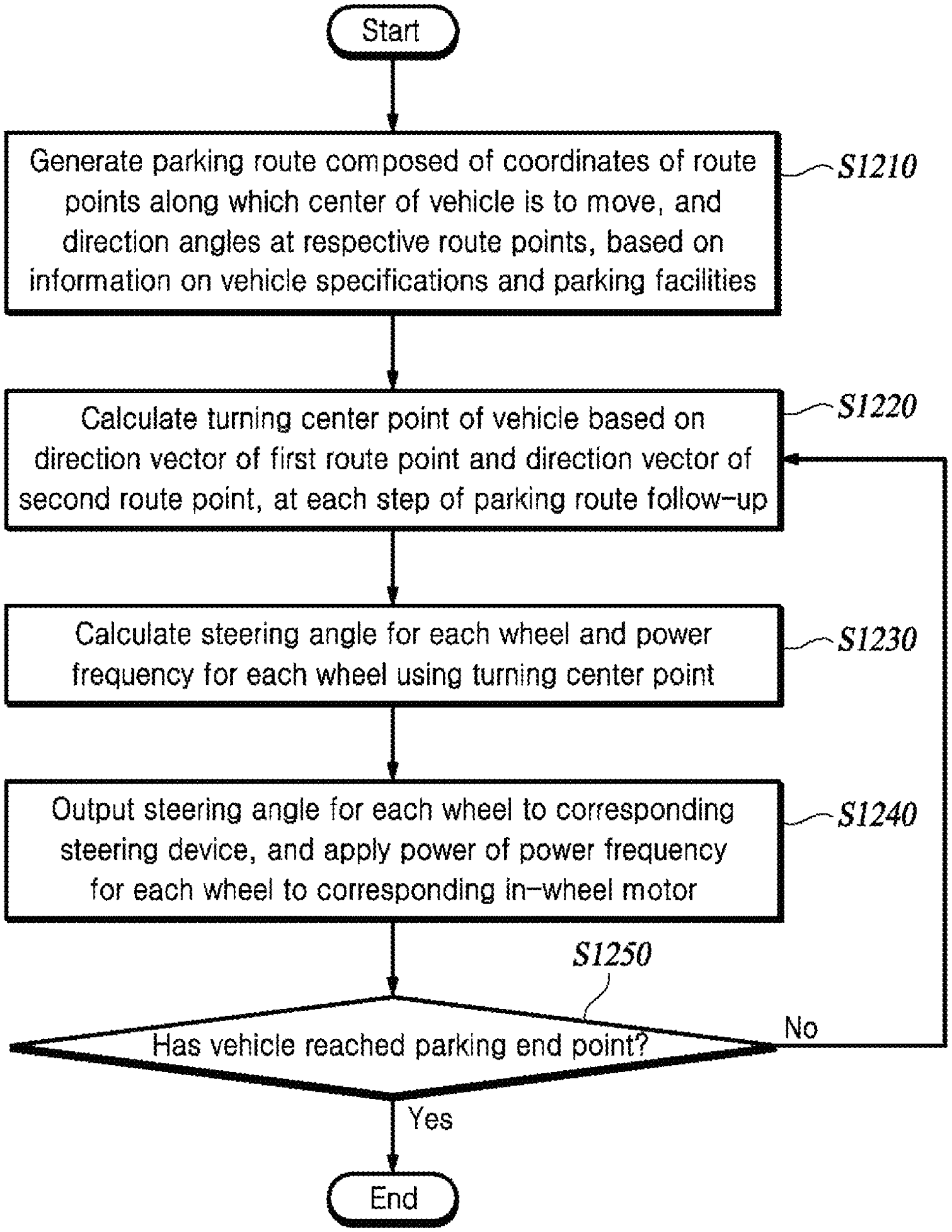
FIG. 12 is a flowchart of a method of generating and following an autonomous parking route by use of a vehicle center and a direction vector, according to at least an exemplary embodiment of the present disclosure.

FIG. 12 is a flowchart of a method of generating and following an autonomous parking route by use of a vehicle center and a direction vector, according to at least an exemplary embodiment of the present disclosure.

Referring to FIG. 12, the method generates a parking route including coordinates of route points at regular intervals representing locations where the center of the vehicle will move along to a parking end point, and direction angles at the respective route points (S1210). At the instant time, the parking route may be generated based on information on the vehicle's specifications and the information on the parking facility. The information on the parking facility may include at least one of a map of the parking facility, information on a target parking space to be parked by the vehicle, information on obstacles around the target parking space, and information on the roads within the parking facility. The parking end point may be set based on the information on the target parking space.

The method determines a turning center point of the vehicle based on the first direction vector at the first route point and the second direction vector at the second route point, which are determined based on the parking route (S1220). The first direction vector and the second direction vector are determined as unit vectors. The method may set a local coordinate system with the first route point of the vehicle as a reference point, determine the first direction vector based on the coordinates and direction angle of the first route point, determine the second direction vector based on the coordinates and direction angle of the second route point, and then perform translation, rotation, and cross product operations on the first direction vector and the second direction vector and thereby determine the turning center point of the vehicle.

Meanwhile, the method may further check the discrepancy between the vehicle's first pose estimated by use of an unscented Kalman filter or the like and the vehicle's second pose based on the parking route. Here, the first pose and the second pose each include position and direction angle information.

When a discrepancy occurs, a step of correcting the turning center point of the vehicle may be further performed based on the first pose.

When the discrepancy between the first pose and the second pose is greater than or equal to a threshold, a step of correcting the parking route may be further performed. This is to correct the parking route for proper route-following on determining that the vehicle has deviated from the parking route by the threshold or more.

Using the turning center point, the wheel-specific steering angle and wheel-specific power frequency of the vehicle are determined (S1230).

The wheel-specific steering angle of the vehicle may be determined based on the turning center point of the vehicle and the vehicle's wheel-specific center position.

The wheel-specific power frequency of the vehicle may be determined as follows. The method determines the turning radius of the vehicle based on the turning center point and the center of the vehicle, determines the wheel-specific turning radius based on the turning center point and the vehicle's wheel-specific center position, determines the angular velocity of the vehicle based on the vehicle turning radius and the required speed, determines the wheel-specific speed by use of the angular velocity of the vehicle and the wheel-specific turning radius, and then determines the wheel-specific power frequency by use of the wheel-specific speed and the wheel-specific radius.

During the time that the vehicle moves from the first route point to the second route point, the wheel-specific steering angle is outputted to the corresponding steering device, and the power of the wheel-specific power frequency is applied to the corresponding in-wheel motor (S1240).

The method determines whether the vehicle has traveled to the parking end point (S1250). If not, the method repeats Steps S1220 through S1240. When the vehicle has traveled to the parking end point, the method end portions autonomous parking.

At least some of the components described in the exemplary embodiments of the present disclosure may be implemented as hardware elements including at least one or a combination of a digital signal processor (DSP), a processor, a controller, an application-specific IC (ASIC), a programmable logic device (FPGA, etc.), and other electronic devices. Furthermore, at least some of the functions or processes described in the exemplary embodiments of the present disclosure may be implemented as software, and the software may be stored in a recording medium. At least some of the components, functions, and processes described in the exemplary embodiments of the present disclosure may be implemented through a combination of hardware and software.

The methods according to the exemplary embodiments of the present disclosure may be written as a program which may be executed on a computer, and may also be implemented in various recording mediums such as a magnetic storage medium, an optical read medium, and a digital storage medium.

Implementations of the various techniques described herein may be realized by digital electronic circuitry, or by computer hardware, firmware, software, or combinations thereof. Implementations may be made as a computer program tangibly embodied in a computer program product, i.e., an information carrier, e.g., machine-readable storage device (computer-readable medium) or a radio signal, for processing by, or controlling the operation of a data processing device, e.g., a programmable processor, a computer, or a plurality of computers. Computer programs, such as the computer program(s) described above, may be written in any form of programming language, including compiled or interpreted languages, and may be deployed in any form as a stand-alone program or as a module, component, subroutine, or other units suitable for use in a computing environment. The computer program may be processed on one computer or a plurality of computers at one site or distributed across a plurality of sites and developed to be interconnected through a communications network.

Processors suitable for processing computer programs include, by way of example, both and special-purpose microprocessors, and any one or more processors of any type of digital computer. Typically, a processor will receive instructions and data from read-only memory or random access memory, or both. Elements of the computer may include at least one processor that executes instructions and one or more memory devices that store instructions and data. In general, the computer may include one or more mass storage devices that store data, such as magnetic disks, magneto-optical disks, or optical disks, or may be coupled to the mass storage devices to receive data therefrom and/or transmit data thereto. Information carriers suitable for embodying computer program instructions and data include, for example, semiconductor memory devices, magnetic mediums such as hard disks, floppy disks, and magnetic tapes, optical mediums such as CD-ROM (Compact Disk Read Only Memory), DVD (Digital Video Disk), magneto-optical mediums such as floptical disk, Read-Only Memory (ROM), Random Access Memory (RAM), flash memory, Erasable Programmable ROM (EPROM), and Electrically Erasable Programmable ROM (EEPROM). The processor and memory may be supplemented by or included in special purpose logic circuitry.

The processor may execute an operating system and software applications executed on the operating system. Furthermore, the processor device may access, store, manipulate, process, and generate data in response to the execution of software. For ease of understanding, the processor device may be referred to as being used as a single processor device, but those skilled in the art will understand that the processor device may include a plurality of processing elements and/or a plurality of types of processing elements. For example, a processor device may include a plurality of processors or one processor, and one controller. Furthermore, other processing configurations, such as parallel processors, are also possible.

In addition, a non-transitory computer-readable medium may be any available medium that may be accessed by a computer and may include both a computer storage medium and a transmission medium.

The present specification includes details of a number of specific implements, but it should be understood that the details do not limit any invention or what is claimable in the specification but rather describe features of the specific exemplary embodiment of the present disclosure. Features described in the specification in the context of individual example embodiments may be implemented as a combination in a single exemplary embodiment of the present disclosure. In contrast, various features described in the specification in the context of a single exemplary embodiment of the present disclosure may be implemented in a plurality of example embodiments individually or in an appropriate sub-combination. Furthermore, the features may operate in a specific combination and may be initially referred to as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. Furthermore, it should not be understood as requiring a separation of various apparatus components in the above described example embodiments in all example embodiments, and it should be understood that the above-described program components and apparatuses may be incorporated into a single software product or may be packaged in a plurality of software products.

It should be understood that the example embodiments included herein are merely illustrative and are not intended to limit the scope of the present disclosure. It will be apparent to one of ordinary skill in the art that various modifications of the example embodiments may be made without departing from the spirit and scope of the claims and their equivalents.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of generating and following an autonomous parking route by use of a vehicle center and a direction vector, the method comprising:

generating, by a processor, a parking route including coordinates of route points indicating locations to which a center of a vehicle moves until the vehicle reaches a parking end point, and a direction angle at each route point; and iteratively performing, by the processor, until the vehicle reaches the parking end point, steps of:

determining a turning center point of the vehicle based on a first direction vector at a first route point and a second direction vector at a second route point, the first direction vector and the second direction vector being determined based on the parking route, and the first direction vector and the second direction vector being unit vectors, wherein determining the turning center point of the vehicle includes:

setting a local coordinate system with the first route point of the vehicle as a reference point;

determining, in the local coordinate system, the first direction vector based on coordinates and a direction angle of the first route point, and determining, in the local coordinate system, the second direction vector based on coordinates and a direction angle of the second route point; and determining the turning center point of the vehicle by performing translation, rotation, and cross product operations on the first direction vector and the second direction vector; and wherein the determining the turning center point further includes:

performing translation and rotation transformations on the first direction vector to obtain transformed vectors; and performing a cross product operation based on start points and end points of the transformed vectors to determine coordinates of an intersection point corresponding to the turning center point;

determining a steering angle for each wheel of the vehicle and a power frequency of each wheel using the turning center point; and outputting the steering angle for each wheel to a corresponding steering device of the vehicle and applying power of the power frequency for each wheel to a corresponding in-wheel motor of the vehicle while the vehicle is moving from the first route point to the second route point.

2. The method of claim 1, wherein the generating of the parking route includes:

generating the parking route based on information on specifications of the vehicle and information on a parking facility, wherein the information on the parking facility includes at least one of a map of the parking facility, information on a target parking space where the vehicle will be parked, information on obstacles around the target parking space, and information on roads within the parking facility, and wherein the parking end point is set based on the information on the target parking space.

3. The method of claim 1, wherein the determining of the turning center point of the vehicle further includes:

estimating a first pose of the vehicle;

obtaining a second pose of the vehicle based on the parking route; and correcting the turning center point of the vehicle based on the first pose in response that a discrepancy occurs between the first pose and the second pose, wherein each of the first pose and the second pose includes information on a position and a direction angle.

4. The method of claim 3, wherein the first pose is estimated by use of an unscented Kalman filter.

5. The method of claim 3, further including:

correcting, by the processor, the parking route in response that the discrepancy between the first pose and the second pose is greater than or equal to a threshold.

6. The method of claim 1, wherein the determining of the steering angle for each wheel includes:

determining the steering angle for each wheel based on a center position for each wheel of the vehicle and the turning center point.

7. The method of claim 1, wherein the determining the power frequency for each wheel of the vehicle includes:

determining a turning radius of the vehicle based on the turning center point and the center of the vehicle;

determining a turning radius for each wheel based on a center position for each wheel of the vehicle and the turning center point;

determining an angular velocity of the vehicle based on the turning radius of the vehicle and a required speed;

determining a speed for each wheel by use of the angular velocity of the vehicle and the turning radius for each wheel; and determining the power frequency for each wheel by use of the speed for each wheel and a radius for each wheel.

8. The method of claim 7, wherein the required speed is a minimum of a speed limit or a speed set by a user, and the speed limit is a maximum speed at which a rollover does not occur depending on the turning radius of the vehicle.

9. A non-transitory computer readable storage medium on which a program for performing the method of claim 1 is recorded.

10. A control apparatus comprising:

at least one processor; and a memory operatively coupled to the at least one processor, wherein the memory stores instructions that cause the at least one processor to perform operations in response to an execution of the instructions by the at least one processor, and wherein the operations include:

generating a parking route including coordinates of route points indicating locations to which a center of a vehicle moves until the vehicle reaches a parking end point, and a direction angle at each route point; and iteratively performing, until the vehicle reaches the parking end point, steps of:

determining a turning center point of the vehicle based on a first direction vector at a first route point and a second direction vector at a second route point, the first direction vector and the second direction vector being determined based on the parking route, and the first direction vector and the second direction vector being unit vectors, wherein determining the turning center point of the vehicle includes:

setting a local coordinate system with the first route point of the vehicle as a reference point;

determining, in the local coordinate system, the first direction vector based on coordinates and a direction angle of the first route point, and determining, in the local coordinate system, the second direction vector based on coordinates and a direction angle of the second route point; and determining the turning center point of the vehicle by performing translation, rotation, and cross product operations on the first direction vector and the second direction vector; and wherein the determining the turning center point further includes:

performing translation and rotation transformations on the first direction vector to obtain transformed vectors; and performing a cross product operation based on start points and end points of the transformed vectors to determine coordinates of an intersection point corresponding to the turning center point;

determining a steering angle for each wheel of the vehicle and a power frequency of each wheel using the turning center point, and outputting the steering angle for each wheel to a corresponding steering device of the vehicle and applying power of the power frequency for each wheel to a corresponding in-wheel motor of the vehicle while the vehicle is moving from the first route point to the second route point.

11. The control apparatus of claim 10, wherein the generating of the parking route includes:

generating the parking route based on information on specifications of the vehicle and information on a parking facility, wherein the information on the parking facility includes at least one of a map of the parking facility, information on a target parking space where the vehicle will be parked, information on obstacles around the target parking space, and information on roads within the parking facility, and wherein the parking end point is set based on the information on the target parking space.

12. The control apparatus of claim 10, wherein the determining of the turning center point of the vehicle further includes:

estimating a first pose of the vehicle;

obtaining a second pose of the vehicle based on the parking route; and correcting the turning center point of the vehicle based on the first pose in response that a discrepancy occurs between the first pose and the second pose, wherein each of the first pose and the second pose includes information on a position and a direction angle.

13. The control apparatus of claim 12, wherein the first pose is estimated by use of an unscented Kalman filter.

14. The control apparatus of claim 12, further including:

correcting the parking route in response that the discrepancy between the first pose and the second pose is greater than or equal to a threshold.

15. The control apparatus of claim 10, wherein the determining of the steering angle for each wheel includes:

determining the steering angle for each wheel based on a center position for each wheel of the vehicle and the turning center point.

16. The control apparatus of claim 10, wherein the determining the power frequency for each wheel of the vehicle includes:

determining a turning radius of the vehicle based on the turning center point and the center of the vehicle;

determining a turning radius for each wheel based on the center position for each wheel of the vehicle and the turning center point;

determining an angular velocity of the vehicle based on the turning radius of the vehicle and a required speed;

determining a speed for each wheel by use of the angular velocity of the vehicle and the turning radius for each wheel; and determining the power frequency for each wheel by use of the speed for each wheel and a radius for each wheel.

17. The control apparatus of claim 16, wherein the required speed is a minimum of a speed limit or a speed set by a user, and the speed limit is a maximum speed at which a rollover does not occur depending on the turning radius of the vehicle.

* * * * *